(12) United States Patent
Boutros

(10) Patent No.: US 12,238,000 B2
(45) Date of Patent: Feb. 25, 2025

(54) UPDATE LIBRARY FOR A SCALABLE LAYER 3 ROUTING SYSTEM

(71) Applicant: Ciena Corporation, Hanover, MD (US)

(72) Inventor: Sami Boutros, Union City, CA (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 18/342,665

(22) Filed: Jun. 27, 2023

(65) Prior Publication Data

US 2025/0007826 A1    Jan. 2, 2025

(51) Int. Cl.
  *H04L 45/00*   (2022.01)
  *H04L 45/02*   (2022.01)
  *H04L 45/24*   (2022.01)
  *H04L 61/58*   (2022.01)
  *H04L 67/568*  (2022.01)

(52) U.S. Cl.
  CPC ............ *H04L 45/563* (2013.01); *H04L 45/02* (2013.01); *H04L 45/24* (2013.01); *H04L 61/58* (2022.05)

(58) Field of Classification Search
  CPC ..... H04L 45/00; H04L 12/4641; H04L 45/58; H04L 45/02; H04L 45/22; H04L 41/0886; H04L 41/0894
  See application file for complete search history.

(56) References Cited

U.S. PATENT DOCUMENTS

| | | | |
|---|---|---|---|
| 7,518,986 B1 * | 4/2009 | Chadalavada | H04L 45/58 714/2 |
| 9,538,423 B2 | 1/2017 | Alvarez et al. | |
| 9,853,833 B2 | 12/2017 | Brissette et al. | |
| 9,979,602 B1 | 5/2018 | Chinnakannan et al. | |
| 9,979,629 B2 | 5/2018 | Sivabalan et al. | |
| 10,250,494 B2 | 4/2019 | Sivabalan et al. | |
| 10,491,483 B2 | 11/2019 | Boutros et al. | |
| 10,523,455 B2 | 12/2019 | Boutros et al. | |
| 10,659,252 B2 | 5/2020 | Boutros et al. | |
| 10,728,174 B2 | 7/2020 | Boutros et al. | |
| 10,797,910 B2 | 10/2020 | Boutros et al. | |
| 10,805,181 B2 | 10/2020 | Boutros et al. | |
| 10,958,462 B2 | 3/2021 | Boutros et al. | |
| 10,979,246 B2 | 4/2021 | Boutros et al. | |
| 10,979,352 B2 | 4/2021 | Boutros et al. | |
| 11,012,357 B2 | 5/2021 | Boutros et al. | |
| 11,128,557 B2 | 9/2021 | Dubey et al. | |
| 11,153,122 B2 | 10/2021 | Dubey et al. | |
| 11,265,246 B2 | 3/2022 | Pallagatti Kotrabasappa et al. | |
| 11,394,643 B2 | 7/2022 | Boutros et al. | |

(Continued)

*Primary Examiner* — Nicholas R Taylor
*Assistant Examiner* — Ho T Shiu
(74) *Attorney, Agent, or Firm* — Baratta Law PLLC; Lawrence A. Baratta, Jr.

(57) ABSTRACT

A method, implemented for a first component of a network element, includes steps of, responsive to one or more routing state updates for one or more routes, updating a route entry for the one or more routes in an update library that communicates with a cache database; and exchanging the routing state updates with a second component of the network element, wherein the exchanging of the routing state updates is bulked where the second component is configured to read all of the exchanged routing state updates. The exchanging is performed instead of providing a routing state message for each of the one or more routing state updates for the same route state.

18 Claims, 5 Drawing Sheets

(56) References Cited

U.S. PATENT DOCUMENTS

| | | |
|---|---|---|
| 11,405,352 B2 | 8/2022 | Boutros et al. |
| 11,533,259 B2 | 12/2022 | Boutros et al. |
| 11,552,879 B1 | 1/2023 | Sivabalan et al. |
| 2004/0022539 A1* | 2/2004 | Bannister ............ H04Q 11/0005 398/55 |
| 2004/0264384 A1* | 12/2004 | Deval .................. H04L 45/023 370/252 |
| 2005/0198250 A1* | 9/2005 | Wang .................. H04L 61/4511 709/223 |
| 2011/0268130 A1 | 11/2011 | Tsier et al. |
| 2019/0034226 A1* | 1/2019 | Gao .................... G06F 9/45558 |
| 2019/0238457 A1* | 8/2019 | T ........................... H04L 45/04 |
| 2021/0111914 A1 | 4/2021 | Boutros et al. |
| 2021/0352007 A1 | 11/2021 | Boutros et al. |
| 2021/0352108 A1* | 11/2021 | Rotkop .................. H04L 47/10 |
| 2022/0086078 A1 | 3/2022 | Sivabalan et al. |
| 2022/0124019 A1 | 4/2022 | Boutros et al. |
| 2022/0131721 A1 | 4/2022 | Boutros et al. |
| 2022/0200903 A1 | 6/2022 | Boutros et al. |
| 2022/0272037 A1 | 8/2022 | Boutros et al. |
| 2022/0337517 A1 | 10/2022 | Boutros et al. |
| 2023/0071325 A1 | 3/2023 | Boutros et al. |
| 2023/0073266 A1 | 3/2023 | Boutros et al. |
| 2023/0146226 A1 | 5/2023 | Sivabalan et al. |
| 2023/0146374 A1 | 5/2023 | Sivabalan et al. |

* cited by examiner

UPDATE LIBRARY FOR A SCALABLE LAYER 3 ROUTING SYSTEM

FIELD OF THE DISCLOSURE

The present disclosure relates generally to networking. More particularly, the present disclosure relates to systems and methods for an update library for a scalable Layer 3 (L3) routing system.

BACKGROUND OF THE DISCLOSURE

Packet network elements operate based on one or more routing protocols, such as, e.g., Border Gateway Protocol (BGP), Intermediate System-Intermediate System (ISIS), Open Shortest Path First (OSPF), and the like. As part of these routing protocols, a network element is configured to provide updates between internal components (e.g., software components such as daemons, etc.) and neighbors (i.e., other network elements). The purpose of these updates is to maintain and populate a Routing Information Base (RIB), program a data plane, program underlying hardware, and the like. These updates typically involve large amounts of communication whereby conventional routing systems involve complex implementations that have scale and convergence disadvantages. Specifically, scale means it is difficult to grow the size of a network element based on the complex implementations and convergence means changes in the network take time.

BRIEF SUMMARY OF THE DISCLOSURE

The present disclosure relates to systems and methods for an update library for a scalable Layer 3 (L3) routing system. The scalable routing system seeks to simplify the development environment, improve scale and convergence, and efficiently support In-Service Software Upgrade (ISSU). The update library provides a novel and efficient way for routing system components to communicate updates to one another, overcoming the complexity, lack of scale, and poor convergence of conventional approaches.

The update library:

(1) dampens routing state communication between components in a network element (e.g., daemons) in network convergence scenarios (such as interface flapping, and other network events) to achieve improved convergence.

(2) maintains a cache database of route states communicated between the components, only one entry per route state will be maintained, regardless of how many updates on this routing state are communicated leading to (a) no message queue overflow and deterministic memory usage, thereby achieving the highest possible scale, and (b) on collaborator daemon restart, the possibility to perform a mark and sweep and replay operation that maintains Non-Stop Forwarding (NSF), for implementation of ISSU.

(3) enables the communication of route state between the components via separate Input/Output (I/O) threads, allowing the main thread in every component, to queue as many route state updates, and only when I/O thread runs all those states will be bulked and queued to the target daemon, offering a unique way of achieving bulking, leading to the highest possible convergence.

In various embodiments, the present disclosure includes a method having steps, a network element configured to implement the steps, and a non-transitory computer-readable medium with instructions configured to cause one or more processors to implement the steps. The steps include responsive to one or more routing state updates for one or more routes associated with a first component of a network element, updating a route entry for the one or more routes by an update library that communicates with a cache database; and exchanging the routing state updates with a second component of the network element, wherein the routing state updates are exchanged in bulk where the second component is configured to read all of the exchanged routing state updates.

The cache database can be one of (1) a common cache database communicatively coupled to both the first component and the second component, and (2) a local cache database for the first component. The exchanging can be performed instead of providing a routing state message for each of the one or more routing state updates. The steps can further include, responsive to a change in a given route, updating the route entry for the given route such that the route entry contains a last state at all times. The steps can further include, responsive to the second component restarting, performing a mark, sweep, and replay operation by the update library of the first component to synchronize all corresponding routing states.

The cache database can include a plurality of entries, one for each route supported by the network element. The first component and the update library can operate in separate threads from one another. The first component can provide one of a routing protocol and a Unified Routing Information Base (URIB) and the second component can provide the other of the routing protocol and the URIB. The first component can provide one of a data plane and a Unified Routing Information Base (URIB) and the second component can provide the other of the data plane and the URIB.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for an update library for a scalable Layer 3 (L3) routing system.

Network Element

Figure 1:
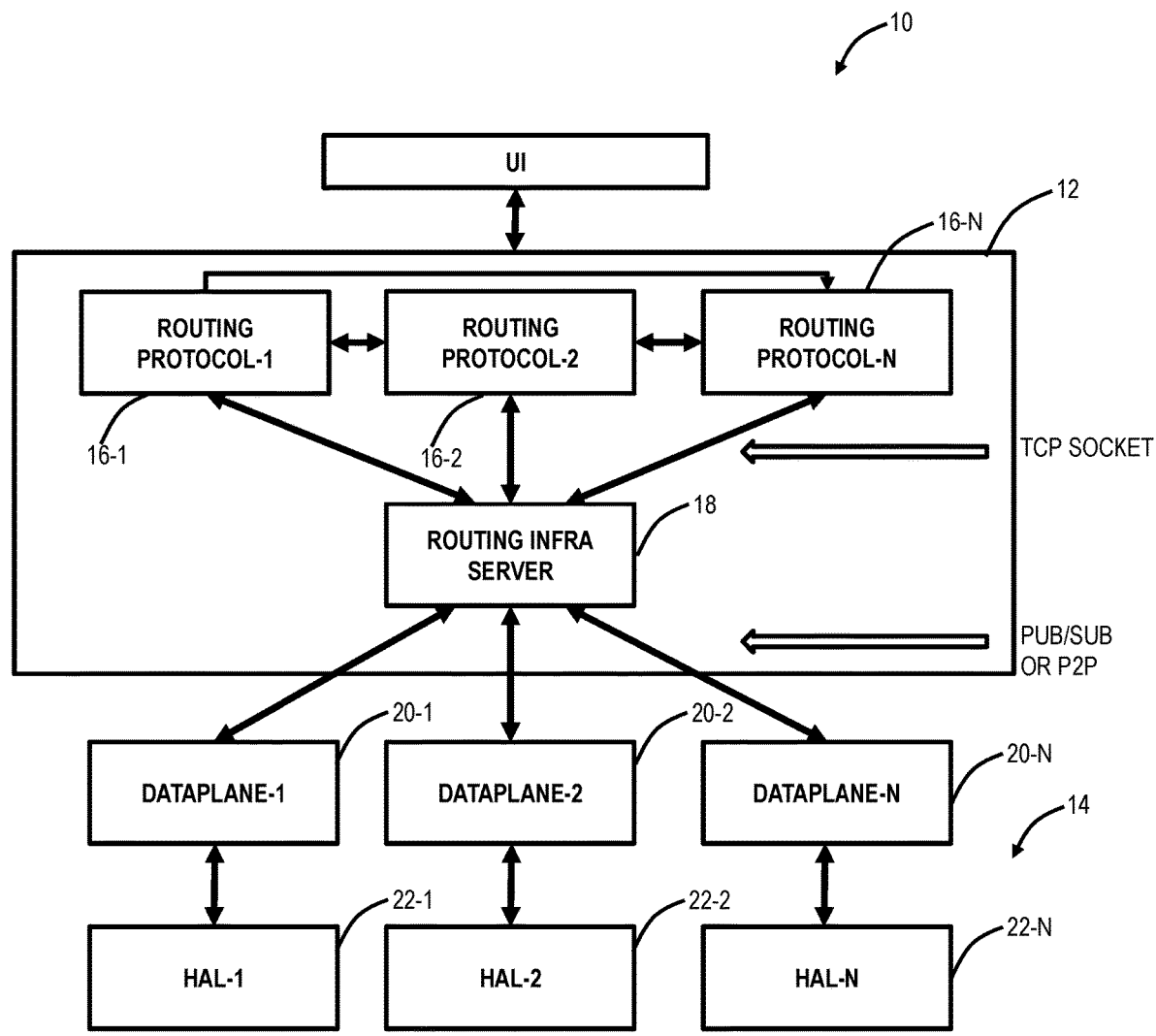
FIG. 1 is a block diagram of a network element illustrating routing functionality therein.

FIG. 1 is a block diagram of a network element 10 illustrating routing functionality therein. In particular, FIG.

1 illustrates routing updates in the control plane and data plane for a network element 10. The network element is a network device capable switching packets according to various routing protocols, and the network element can be referred to as a router, a switch, and the like. The routing protocols can include Border Gateway Protocol (BGP), Intermediate System-Intermediate System (ISIS), Open Shortest Path First (OSPF), and the like. Those of ordinary skill in the art will recognize FIG. 1 is a functional diagram in an oversimplified manner, and a practical embodiment may include additional components and suitably configured processing logic to support known or conventional operating features that are not described in detail herein.

The network element 10 includes switching components 12 and interface components 14. The switching components can include various routing protocols 16-1, 16-2, 16-N communicatively interconnected to one another and to a routing infrastructure server 18. The switching components 12 can include a combination of hardware, software, firmware, etc. that moves packets, frames, etc. coming into the network element 10 out via the interface components 14. The switching components 12 includes switching/routing units; integrated circuits contained in the switching/routing units; and programming that allows switching/routing to be controlled.

The interface components 14 are for ports to interconnect the network element 10 to other network elements, for data traffic in the data plane and for control traffic in the control plane. The interface components 14 include data plane components 20-1, 20-2, 20-N, each connected to a Hardware Abstraction Layer (HAL) 22-1, 22-2, 22-N. The HAL 22-1, 22-2, 22-N is configured to control underlying hardware forming physical ports in the interface components 14. Additionally, there The various components 12, 14 are functional components and include software and/or firmware operating on underlying hardware. For example, each of various components 12, 14 can be a daemon which is a program that runs continuously as a background process. That is, the components 12, 14 can be routing stack daemons. Those skilled in the art will recognize there can be any type of implementation for the components 12, 14 which include software and/or firmware, each being executed on underlying hardware, as well as programmable hardware such as Field Programmable Gate Arrays (FPGAs), Application Specific Integrated Circuits (ASICs), Network Processing Units (NPUs), and the like. The key is each of the components 12, 14 is involved in providing and distributing routing updates.

As is known in the art, the physical implementation of the network element 10 can include blades, line cards, line modules, circuit packs, pluggable modules, rack-mounted units ("pizza boxes"), and the like. Each of these devices can include various electronic devices and/or optical devices mounted on a circuit board along with various interconnects, including interfaces to the chassis, shelf, etc. Again, those of ordinary skill in the art will recognize the network element 10 can include other components which are omitted for illustration purposes. That is, FIG. 1 is meant to provide a functional view, and those of ordinary skill in the art will recognize actual hardware implementations may vary; all of which are contemplated herewith.

Goals

The present disclosure includes a so-called update library that is described in detail herein. The update library includes functionality for communicating messages between the components 12, 14, such as routing updates. The following goals summarize the intent of the update library.

First, the objective is to simplify the development environment. Here, the update library is a common Inter-process Communication (IPC) infrastructure for all communications between the routing stack daemons and other containers, components, etc. This allows the routing stack daemons and routing infrastructure/data plane to focus on protocol development, without worrying about scale, convergence, ISSU, etc. as these are delegated to the update library. Another aspect of the simplification is to minimize the number of messages used to communicate routing updates between daemons. To this end, the update library includes a cache with routing updates included therein in such a manner that there is not a need to send a new message for every update on a particular route, thereby minimizing data exchange between the components 12, 14.

Second, the update library provides scale and convergence. To this end, input/output (I/O) communication between the components 12, 14 is performed in separate threads, namely the update library, thereby making the routing system in the network element 10 asynchronous. The update library includes a damping function (i.e., we only care about the last routing state) and bulking (i.e., multiple updates at once). Specifically, the update library includes queues for communication between the daemons and between the data plane. The queues enabling caching of routing state updates between the various components 12, 14. As is described herein, the update library includes an entry for each routing update, thus it deterministically supports as many routes as entries. Each entry is maintained and updated in the queue (cache). Instead of sending routing update messages for each change, the entry is changed and reflects the current (last) state thereby dampening routing updates.

Third, the architecture of the update library provides ISSU to all the routing system components 12, 14. That is, all the latest routing updates exist in the update library for each route, and ISSU can be implemented with Application Programming Interfaces (APIs) along with versioning. The update library is a separate module or function and is included in each of the components 12, 14. Upon restarting, a daemon can implement a proper mark and sweep and replay using the cached routing state maintained by the update library.

Update Library in the Network Element Components

Figure 2:
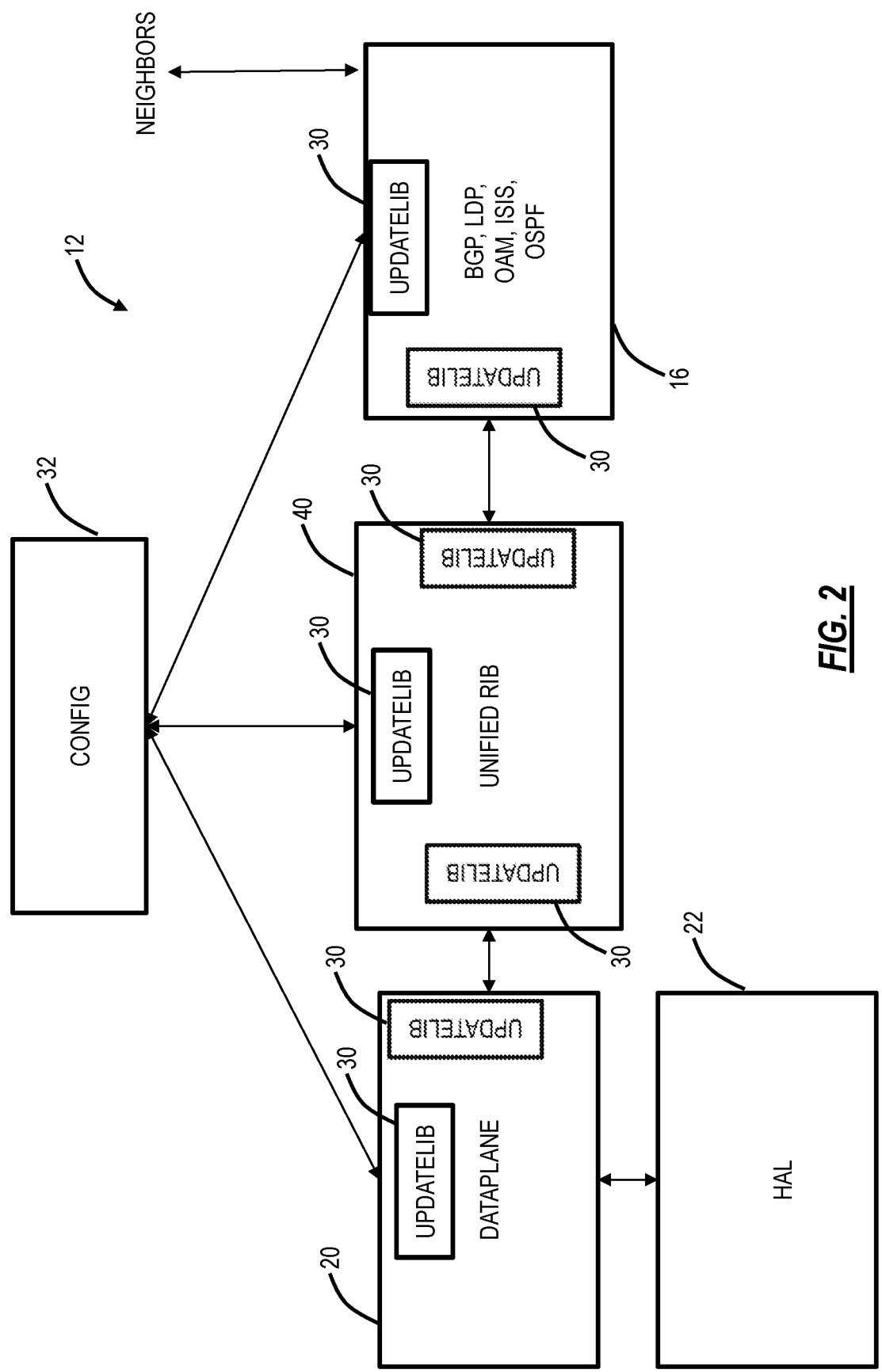
FIG. 2 is a block diagram of example switching components including update libraries for routing updates therebetween.
Figure 3:
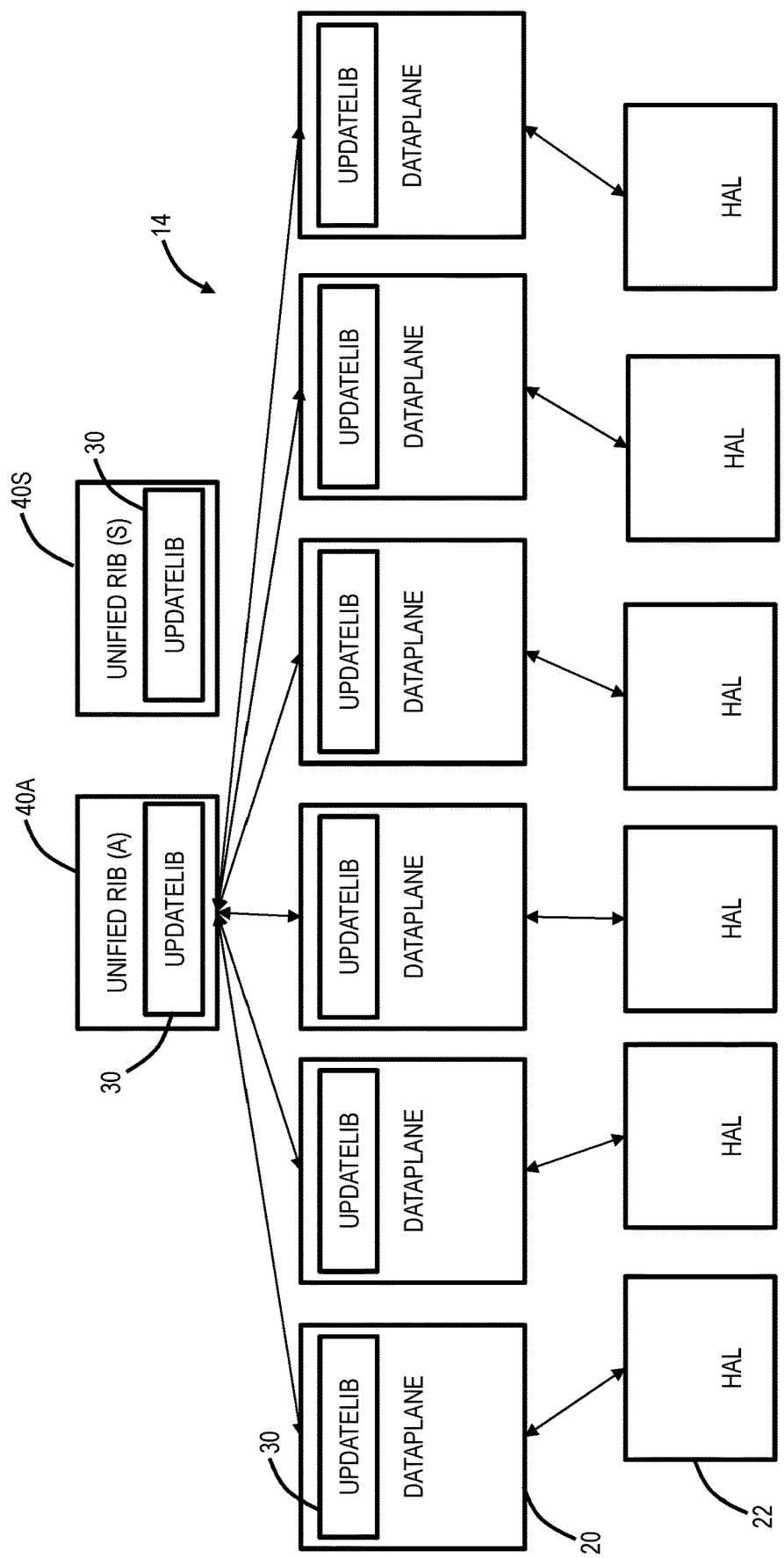
FIG. 3 is a block diagram of example interface components communicating with the example switching components and including update libraries for routing updates therebetween.

FIG. 2 is a block diagram of example switching components 12 including update libraries 30 for routing updates therebetween. FIG. 3 is a block diagram of example interface components 14 communicating with the example switching components 12 and including update libraries 30 for routing updates therebetween.

In FIG. 2, there is a configuration 32 connected to the update libraries 30 of each of the components 12. The configuration 32 can be a user interface, management system, etc. allowing user configuration of routes. For illustration purposes, the switching components 12 include the data plane 20, connected to the HAL 22, a Unified Routing Information Base (RIB or URIB) 40, and the routing protocols 16, e.g., BGP, ISIS, OSPF, etc. The update libraries 30 are illustrated as components facing the configuration 32 and one another. For example, the data plane 20 has an update library 30 facing an update library 30 on the URIB 40. The URIB 40 has an update library 30 facing an update library 30 on the routing protocols 16, etc. From an implementation perspective, the update libraries 30 can be a single update library 30 per component 16, 20, 40 as well as different update libraries 30 for each IPC connection (i.e., between the data plane 20 and the URIB 40, between the URIB 40 and the routing protocols 16). Those skilled in the art will recognize any of these physical implementations are contemplated.

In FIG. 3, the interface components 14 include an update library 30 for each data plane 20 and the associated HAL 22. Each of the data planes 20 have their update library 30 connect and communicate with the update library 30 on an active URIB 40A. There can be a standby URIB 40S as well.

Update Library

The update library 30 is physically implemented in hardware including memory, circuitry, firmware, and/or software for storing, updating, and communicating messages between the routing protocols 16 and the URIB 40 (FIG. 2), between the URIB 40 and the data plane 20 (FIG. 3), and the like. Specifically, the update library 30 includes a plurality of entries, one for each route. For example, the network element 10 can support hundreds of thousands or millions of routes, and there is one entry for each supported route. In this manner, there is determinism in terms of supported routes, namely the number of entries, and on the messaging volume. An aspect of the update library 30 is a component 12, 14 keeps the latest state update in the given entry in the update library 30 for that route.

For the components 12, 14, they can be implemented as multi thread daemons. For example, the routing protocols 16 main functionality can be running in one thread and the corresponding update library 30 functionality can be running in another thread. As described herein, the main functionality includes various processes associated with running a routing protocol, e.g., BGP, OSPF, ISIS, etc., and the update library 30 functionality involves messaging to other components (URIB, DP, etc., including other routing protocol components). As such, routing state communication is dampened by the update library 30. The routing state communication is between daemons and can be significant in network convergence scenarios (such as interface flapping, and other network events). By dampening delete/add/modify of routes state in major network events, the daemons will only process the latest routes state, achieving the highest possible convergence.

The update library 30 includes circuitry that maintains a cache database of route states communicated between daemons. In particular, only one entry per route state is maintained, regardless of how many updates on this routing state are communicated. In effect, when there is a route update for a particular route, the component 12, 14 updates the route state in the update library 30, instead of sending a new message for each update. As such, the update library 30 contains the latest state for each route. This will never lead to message queue overflow for traditional state communication system between daemons, that maintain a message state per route state transition, the message queue length will never exceed the maximum number of routes supported. Again, this leads to a deterministic memory usage, achieving the highest possible scale.

In an embodiment, the cache database in the update library 30 is a distributed database. There can be a cache in the routing protocol 16 daemon for the messages to be sent/received to/from the URIB 40, and there can be a cache in the URIB 40 for the messages to be sent/received to/from routing protocol 16 daemon. The routing protocol 16 daemon can continually update the route states in its cache database in the main thread context, and when the update library 30 threads runs, all of the updated states can be provided in a bulk manner.

The presence of this cache database, for routes state exchange will allow the update library 30 on daemon restart to perform mark and sweep operation. Here, the route states received by a restating daemon are marked, and only sweep/delete remaining stale states, after the restarting daemon comes back and refreshes the stale states and inform that replay is done, to achieve Non-Stop Forwarding (NSF) without a complex daemon implementation to achieve the same. That is, on daemon restart, the running daemon will replay routes state from the cached database in the update library 30. This offers a unique way to implement ISSU.

For normal route state updates, the communication of route states between daemons occurs via separate I/O threads. This allows the main thread in every daemon to queue multiple route state updates, and only when I/O thread runs, the update library 30 has all these states bulked and queued to the target daemon, offering a unique way of achieving bulking, leading to the highest possible convergence.

Update Library Process

Figure 4:
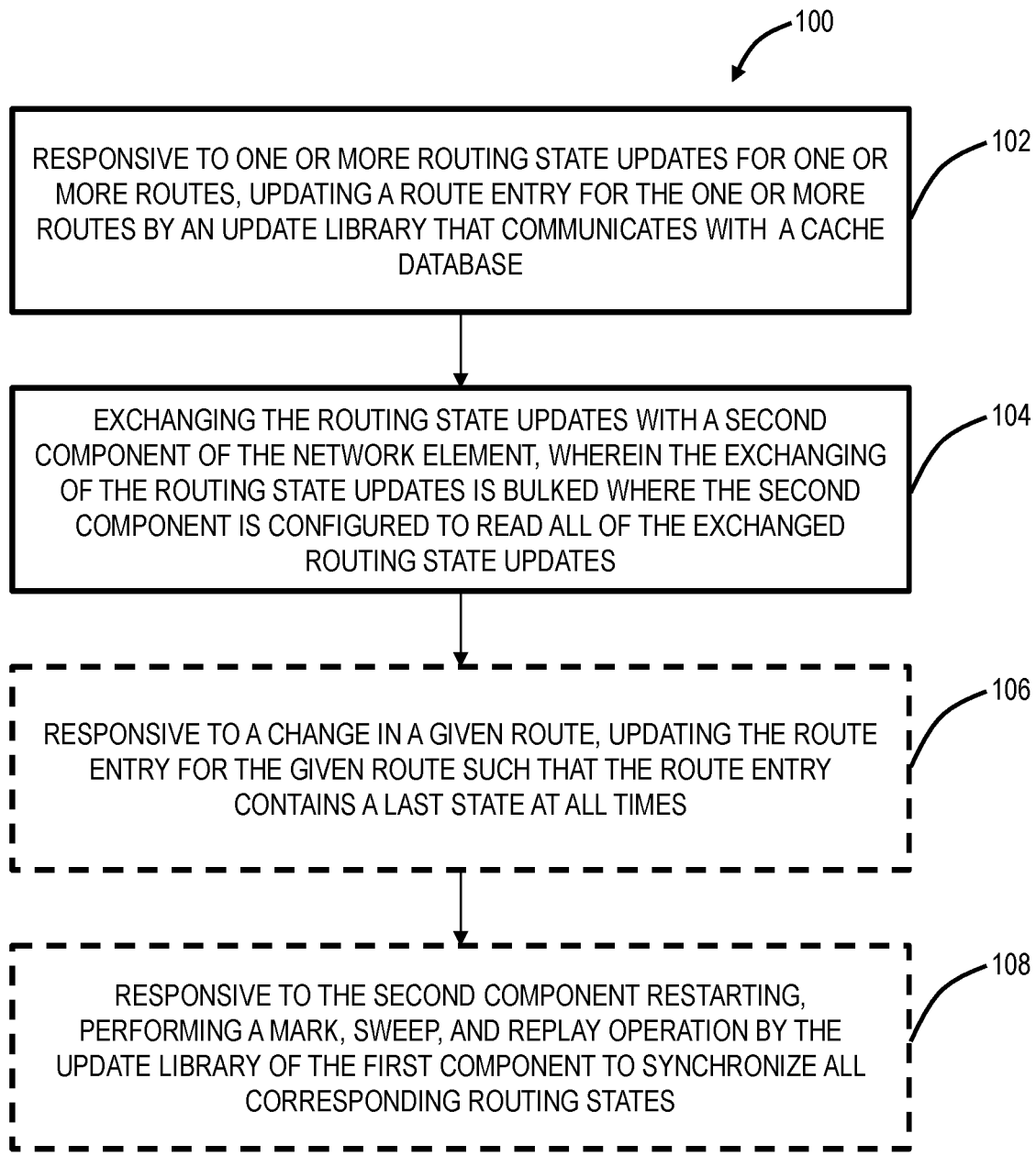
FIG. 4 is a flowchart of a process for operating the update library for routing state update exchanges between components in the network element.

FIG. 4 is a flowchart of a process 100 for operating the update library 30 for routing state update exchanges between components 12, 14 in the network element 10. Again, the update library 30 includes circuitry that can execute software and/or firmware for implementation of the process 100. The process 100 can be realized as a method having steps, via a processing device 200 (see FIG. 5) configured to implement the steps, and as a non-transitory computer-readable medium storing instructions that, when executed, cause circuitry to implement the steps. Also, the process 100 can be implemented by the update library 30 in any of the components 12, 14 in the network element 10. For example, to communicate messages between the routing protocols 16 and the URIB 40, between the URIB 40 and the data plane 20, between the routing protocols 16, and the like.

The process 100 includes, responsive to one or more routing state updates for one or more routes, updating a route entry for the one or more routes by an update library that communicates with a cache database (step 102); and exchanging the routing state updates with a second component of the network element, wherein the exchanging of the routing state updates is bulked where the second component is configured to read all of the exchanged routing state updates (step 104).

Of note, the exchanging is performed instead of providing a routing state message for each of the one or more routing state updates. That is, we only care about the last state of a routing object in the cache database. This state can be updated multiple times, even before the updates are exchanged. The process 100 can include, responsive to a change in a given route, updating the route entry for the given route such that the route entry contains a last state at all times (step 106).

In this manner, the process 100 can be said to include dampening and bulking for the routing state updates. Dampening means the cache database only includes the last state of a given route and there does not need to be a message for every route state transition. The exchange provides the last state and can avoid intermediate updates. The bulking means the communication by the update library 30 can be a separate thread as the first component. The first component, e.g., a main protocol daemon thread, can queue as many routing state updates as possible. When the update library 30 thread runs, it can bulk all of the updates. Of note, any route only has one entry in the update library cache, regardless of how many updates to the route happen in practice.

The process 100 can include, responsive to the second component restarting, performing a mark, sweep, and replay operation by the update library of the first component to synchronize all corresponding routing states (step 108). As described herein, this is the idea of ISSU and NSF for free, i.e., based on the architecture of the update library. Here, when the first component goes down, the second component can mark, sweep, and replay all routing states in the update library corresponding to the first component.

The cache database includes a plurality of entries, one for each route supported by the network element. The first component and the update library can operate in separate threads from one another. The first component can provide one of a routing protocol and a Unified Routing Information Base (URIB) and the second component provides the other of the routing protocol and the URIB. The first component can provide one of a data plane and a Unified Routing Information Base (URIB) and the second component provides the other of the data plane and the URIB.

As described herein, the present disclosure utilizes updates in a cache database to improve routing state updates. Various implementations of the cache database are possible, all of which are contemplated herein. Specifically, the cache database can be one of (1) a common cache database communicatively coupled to both the first component and the second component, and (2) a local cache database for the first component.

For the common cache database, the different components update the same database and there are queues listing which entries should be updated (read) by which component. That is, all of the components operate in the common cache database which is shared between them. For the local cache database, each component can have its own local cache database and the updates are exchanged by synchronization therebetween. Those skilled in the art will recognize there could be various other physical implementations, all of which are incorporated herein.

Example Processing Device

Figure 5:
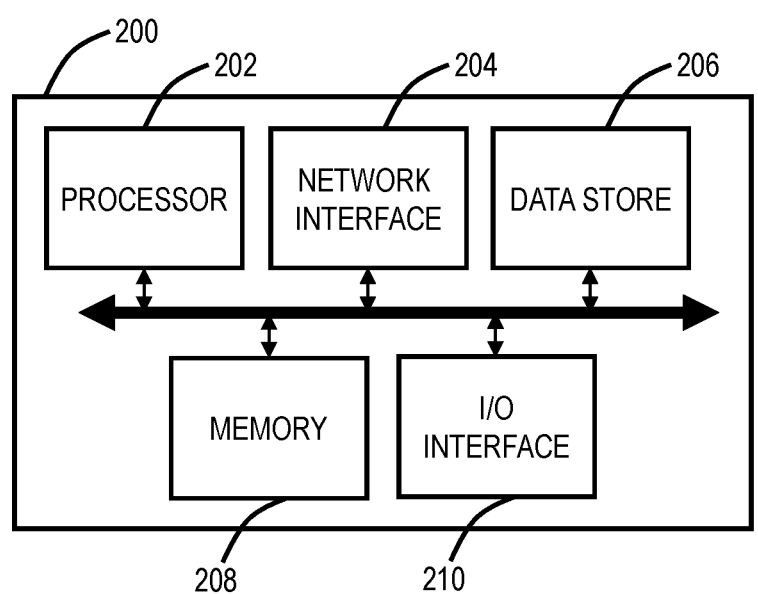
FIG. 5 is a block diagram of an example processing device.

FIG. 5 is a block diagram of an example processing device 200. The processing device 200 can be part of the network element 10, for purposes of implementing any of the components 12, 14 and the update library 30. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, or the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof.

Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

Conclusion

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections may include headers for various embodiments and those skilled in the art will appreciate these various embodiments may be used in combination with one another as well as individually. Further, it is noted that the various elements, operations, steps, methods, processes, algorithms, functions, techniques, etc. described herein can be used in any and all combinations with one another.

What is claimed is:

1. A network element comprising circuitry configured to:
responsive to one or more routing state updates for one or more routes associated with a first component of a network element, update a route entry for the one or more routes by an update library that communicates with a cache database; and
exchange the routing state updates with a second component of the network element, wherein the routing state updates are exchanged in bulk where the second component is configured to read all of the exchanged routing state updates, wherein the routing state updates are related to one or more Layer 3 (L3) routing protocols and the routing state updates are exchanged via the cache database without sending messages, wherein the update library is configured to communicate only a last routing state from the cache database, and wherein the one or more L3 routing protocols include Border Gateway Protocol (BGP), Intermediate System-Intermediate System (ISIS), and Open Shortest Path First (OSPF).

2. The network element of claim 1, wherein the cache database is one of (1) a common cache database communicatively coupled to both the first component and the second component, wherein the first component and the second component update the same database and (2) a local cache database for the first component.

3. The network element of claim 1, wherein the circuitry is further configured to
responsive to a change in a given route, update a corresponding route entry for the given route such that the corresponding route entry contains the last state at all times.

4. The network element of claim 1, wherein the circuitry is further configured to
responsive to the second component restarting, perform a mark, sweep, and replay operation configured to maintain Non-Stop Forwarding for implementation on In-Service Software Upgrade (ISSU) by the update library of the first component to synchronize all corresponding routing states.

5. The network element of claim 1, wherein the cache database includes a plurality of entries, one for each route supported by the network element.

6. The network element of claim 1, wherein the first component and the update library operate in separate threads from one another.

7. The network element of claim 1, wherein the first component provides one of the routing protocol and a Unified Routing Information Base (URIB) and the second component provides the other of the routing protocol and the URIB.

8. The network element of claim 1, wherein the first component provides one of a data plane and a Unified Routing Information Base (URIB) and the second component provides the other of the data plane and the URIB.

9. A method, implemented for a first component of a network element, the method comprising steps of:
responsive to one or more routing state updates for one or more routes, updating a route entry for the one or more routes by an update library that communicates with a cache database; and
exchanging the routing state updates with a second component of the network element, wherein the exchanging of the routing state updates is bulked where the second component is configured to read all of the exchanged routing state updates, wherein the routing state updates are related to one or more Layer 3 (L3) routing protocols and the routing state updates are exchanged via the cache database without sending messages, wherein the update library is configured to communicate only a last routing state from the cache database, and wherein the one or more L3 routing protocols include Border Gateway Protocol (BGP), Intermediate System-Intermediate System (ISIS), and Open Shortest Path First (OSPF).

10. The method of claim 9, wherein the cache database is one of (1) a common cache database communicatively coupled to both the first component and the second component, and (2) a local cache database for the first component.

11. The method of claim 9, wherein the steps further include
responsive to a change in a given route, updating a corresponding route entry for the given route such that the corresponding route entry contains the last state at all times.

12. The method of claim 9, wherein the steps further include
responsive to the second component restarting, performing a mark, sweep, and replay operation by the update library of the first component to synchronize all corresponding routing states.

13. The method of claim 9, wherein the cache database includes a plurality of entries, one for each route supported by the network element.

14. The method of claim 9, wherein the first component and the update library operate in separate threads from one another.

15. A non-transitory computer-readable medium comprising instructions that, when executed, cause circuitry to perform steps of:
responsive to one or more routing state updates for one or more routes associated with a first component of a network element, updating a route entry for the one or more routes by an update library that communicates with a cache database, and
exchanging the routing state updates with a second component of the network element, wherein the exchanging of the routing state updates is bulked where the second component is configured to read all of the exchanged routing state updates, wherein the routing state updates are related to one or more Layer 3 (L3) routing protocols and the routing state updates are exchanged via the cache database without sending messages, wherein the update library is configured to communicate only a last routing state from the cache database, and wherein the one or more L3 routing protocols include Border Gateway Protocol (BGP), Intermediate System-Intermediate System (ISIS), and Open Shortest Path First (OSPF).

16. The non-transitory computer-readable medium of claim 15, wherein the cache database is one of (1) a common cache database communicatively coupled to both the first component and the second component, and (2) a local cache database for the first component.

17. The non-transitory computer-readable medium of claim 15, wherein the steps further include
- responsive to a change in a given route, updating a corresponding route entry for the given route such that the corresponding route entry contains a last state at all times.

18. The non-transitory computer-readable medium of claim 15, wherein the steps further include
- responsive to the second component restarting, performing a mark, sweep, and replay operation by the update library of the first component to synchronize all corresponding routing states.

\* \* \* \* \*